United States Patent
Lin et al.

(10) Patent No.: US 7,110,046 B2
(45) Date of Patent: Sep. 19, 2006

(54) METHOD FOR DYNAMICALLY ADJUSTING VIDEO BRIGHTNESS

(75) Inventors: Pin-Ting Lin, Shindian (TW); Hochao Huang, Shindian (TW)

(73) Assignee: Cyberlink Corp., Shindian (TW)

( * ) Notice: Subject to any disclaimer, the term of this patent is extended or adjusted under 35 U.S.C. 154(b) by 518 days.

(21) Appl. No.: 10/700,843

(22) Filed: Nov. 4, 2003

(65) Prior Publication Data

US 2005/0093795 A1 May 5, 2005

(51) Int. Cl.
H04N 5/14 (2006.01)
H04N 5/52 (2006.01)
H04N 9/69 (2006.01)
G09G 5/02 (2006.01)
G09K 9/00 (2006.01)
G09K 9/34 (2006.01)
G09K 9/38 (2006.01)

(52) U.S. Cl. .............. 348/679; 348/672; 348/673; 348/674; 348/678; 345/589; 345/684

(58) Field of Classification Search .......... 348/254, 348/678, 679, 672–675; 345/589, 684; 382/168–172; H04N 5/14, 9/69, 5/52; G09G 5/02; G06K 9/00, G06K 9/34, 9/38
See application file for complete search history.

(56) References Cited

U.S. PATENT DOCUMENTS

| | | | | | |
|---|---|---|---|---|---|
| 5,862,254 | A | * | 1/1999 | Kim et al. | 382/168 |
| 5,963,665 | A | * | 10/1999 | Kim et al. | 382/169 |
| 6,049,626 | A | * | 4/2000 | Kim | 382/167 |
| 6,075,890 | A | * | 6/2000 | Park | 382/169 |
| 6,078,686 | A | * | 6/2000 | Kim | 382/167 |
| 6,101,294 | A | * | 8/2000 | McCaffrey et al. | 382/312 |
| 6,259,472 | B1 | * | 7/2001 | Park | 348/28 |
| 6,507,372 | B1 | * | 1/2003 | Kim | 348/630 |
| 6,687,400 | B1 | * | 2/2004 | Szeliski | 382/168 |
| 6,741,736 | B1 | * | 5/2004 | Jaspers | 382/169 |
| 6,826,310 | B1 | * | 11/2004 | Trifonov et al. | 382/274 |
| 7,003,153 | B1 | * | 2/2006 | Kerofsky | 382/168 |
| 2003/0161549 | A1 | * | 8/2003 | Lei et al. | 382/274 |
| 2004/0213478 | A1 | * | 10/2004 | Chesnokov | 382/260 |
| 2005/0100242 | A1 | * | 5/2005 | Trifonov et al. | 382/274 |
| 2005/0213125 | A1 | * | 9/2005 | Smith et al. | 358/1.9 |

* cited by examiner

*Primary Examiner*—Brian P. Yenke
(74) *Attorney, Agent, or Firm*—THomas, Kayden, Horstemeyer & Risley

(57) ABSTRACT

A method for dynamically adjusting video brightness performs histogram equalization on a video YUV brightness/color signal to generate an equalization brightness curve. The brightness of each pixel is compared with every pixel of the video frame before and after histogram equalization to generate a comparison difference value. The brightness of the pixel is adjusted so that the brightness difference after adjustment won't be larger than three times of the comparison difference value and won't be smaller than a fourth of the comparison difference value. The brightness of each pixel before and after histogram equalization is compared, one by one, to generate a brightness difference value. The brightness difference value is adjusted so that the brightness difference after adjustment won't be larger than a largest brightness value and won't be smaller than a smallest brightness value. The brightness of each video frame can be properly adjusted to accomplish clearer displaying effect.

17 Claims, 6 Drawing Sheets

METHOD FOR DYNAMICALLY ADJUSTING VIDEO BRIGHTNESS

FIELD OF THE INVENTION

The present invention relates to a method for dynamically adjusting video brightness and, more particularly, to a method that automatically performs histogram equalization on each video frame and dynamically adjusts the brightness and color intensity thereof using relevant restrictions.

BACKGROUND OF THE INVENTION

Liquid crystal displays (LCDs) and plasma display panels (PDPs) are gradually replacing conventional cathode ray tubes (CRTs). When playing an audio/video medium, e.g., a video compact disc (VCD) or a digital versatile disc (DVD), on home AV equipment or a personal computer, the brightness, contrast and color intensity of the screen often can't conform to each video frame. Therefore, the video frames are sometimes too bright or too dark. Moreover, the color intensity varies. It is necessary to adjust dynamically the brightness, contrast and color intensity to accomplish the optimum displaying effect.

Existent displays, especially LCDs, generally can't dynamically adjust the brightness, contrast and color intensity according to the video images displayed thereon. If the video image is darker and the LCD has an insufficient brightness, the frame can't be clearly seen.

Accordingly, a smart automatic brightness, contrast and color correction system has been proposed in the prior art, which can dynamically correct the brightness, contrast and color of the LCD screen according to the video image frame. However, because this prior art applies to LCD hardware, the architecture is complicated and expensive, and can't be realized on each display.

SUMMARY OF THE INVENTION

The primary object of the present invention is to provide a method for dynamically adjusting video brightness to accomplish the optimum displaying effect.

To achieve the above object, first, histogram equalization is performed on a video YUV brightness/color signal to generate an equalization brightness curve. The brightness of each pixel before and after histogram equalization is compared with the brightness of every pixel of the video frame, one by one, to generate a comparison difference value. The brightness of the pixel is adjusted so that the brightness difference after adjustment won't be larger than three times the comparison difference value and won't be smaller than a fourth of the comparison difference value. Next, the brightness of each pixel before and after histogram equalization is compared, one by one, to generate a brightness difference value. The brightness difference value is adjusted so that the brightness difference after adjustment won't be larger than a largest brightness value and won't be smaller than a smallest brightness value. The equalization brightness curve of the video frame and that of at least a video frame before are compared. The pixel brightness of each video frame is adjusted so that the brightness difference after adjustment won't be larger than a largest brightness difference value after at least one adjustment. The brightness of each video frame can thus be properly adjusted to accomplish a clearer displaying effect.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
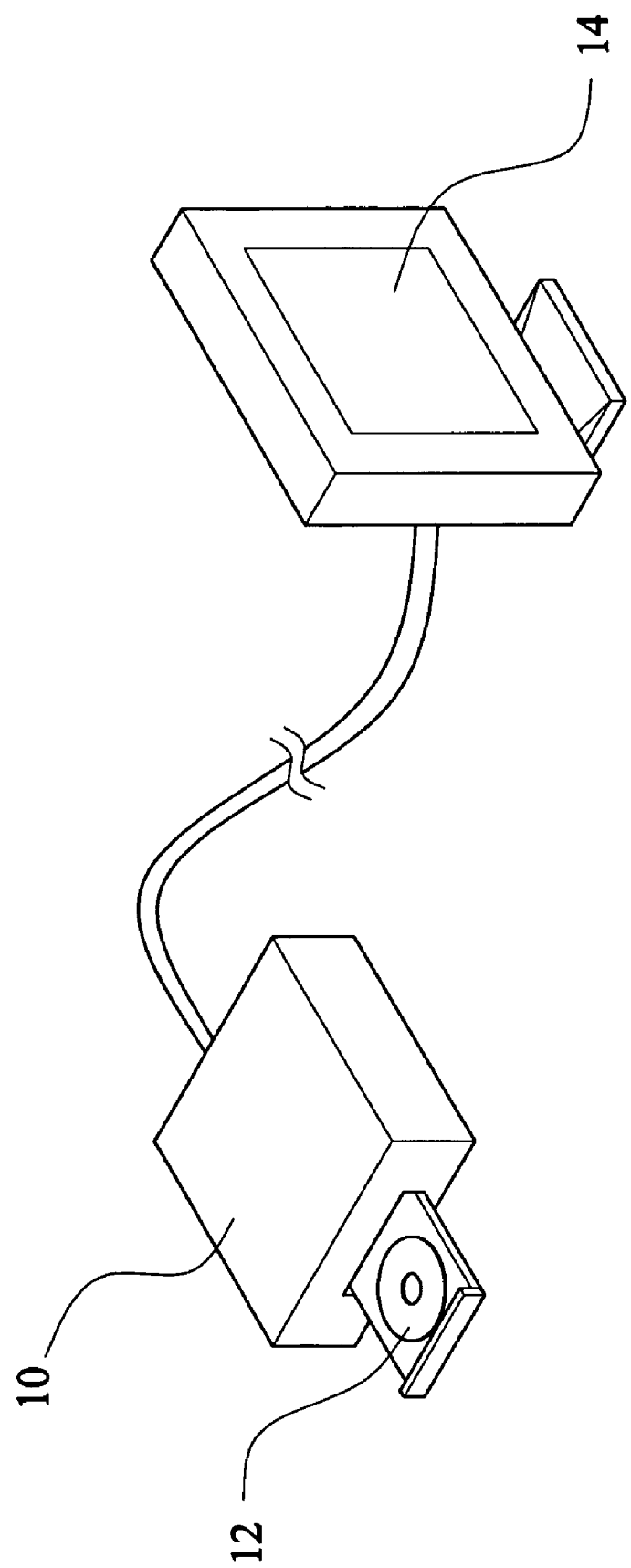
FIG. 1 is an architectural diagram of the present invention applied in a playing device.

As shown in FIG. 1, a dynamic adjustment method video brightness of the present invention mainly applies to a video playing device 10, which is, for example, a DVD player. At the same time the video signal of an audio/video medium 12 is read out, software is used to analyze the brightness, contrast and color intensity in the signal in real time and dynamically adjust the video signal to accomplish the optimum displaying effect for output to a display 14. Therefore, the best display can be provided with the lowest cost. The present invention can also be used for post-processing of video media. For instance, before authoring a video signal into an audio/video medium like a DVD disc, the dynamic adjustment method video brightness of the present invention can be used to adjust for the most appropriate brightness before recording in the audio/video medium.

Figure 2:
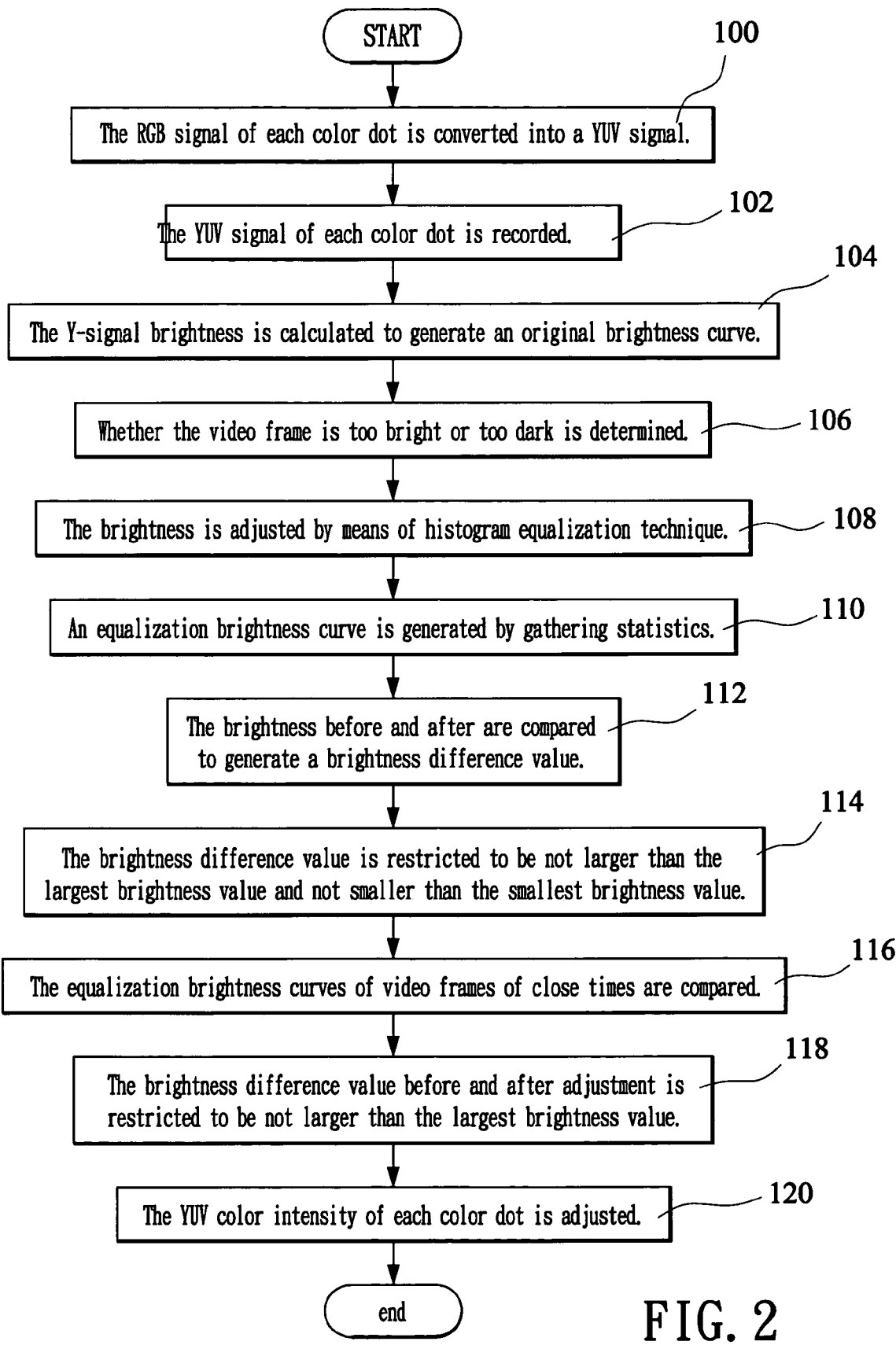
FIG. 2 is a dynamic adjustment flowchart of video brightness of the present invention.
Figure 3:
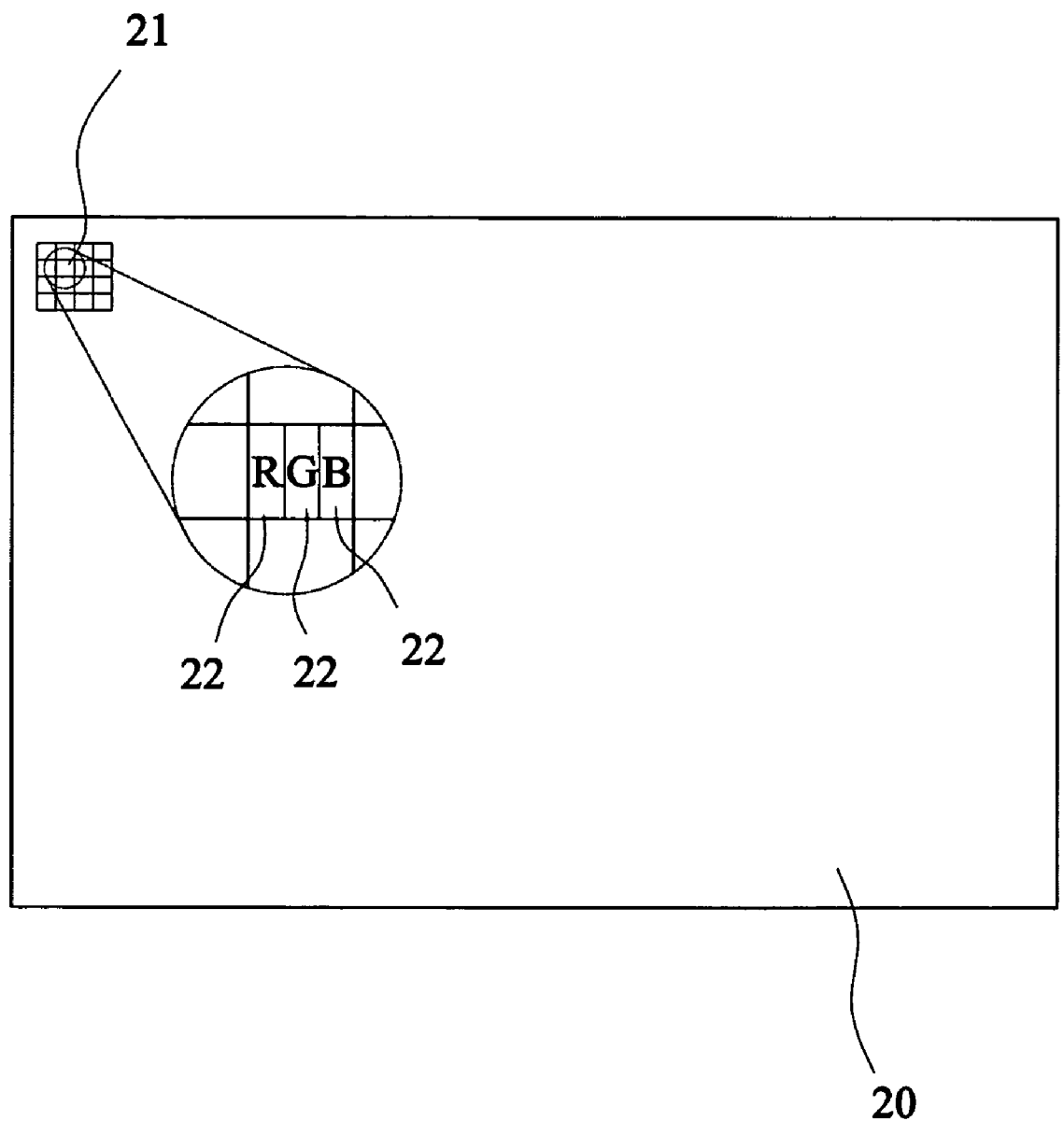
FIG. 3 is a view showing a video frame and an enlarged pixel of the present invention.

As shown in FIG. 2, the dynamic adjustment method video brightness of the present invention makes use of a histogram equalization technique, which is used for processing real-time images to enhance image contrast. However, the histogram equalization technique will cause problems such as more noise due to a too large difference before and after brightness adjustment, much larger brightness differences at regions originally having close brightness, and glittering. Therefore, the brightness adjustment should be restricted somehow to solve the above problems.

The dynamic adjustment method video brightness of the present invention first analyzes a video signal input from the playing device 10. The video signal is a succession of signals, which comprises a plurality of frames 20. Each of the frames 20 is composed of a plurality of pixels 21, which can be displayed on the screen. Each of the pixels 21 includes subpixels 22 generated by the red (R), green (G) and blue (B) color signals. However, because most of the video signals stored in a medium are YUV brightness/color signals, they can be processed directly. On the other hand, it is necessary to first convert the red (R), green (G) and blue (B) color signals into YUV brightness/color signals.

The first step of analyzing the video signal of the present invention is to convert the red (R), green (G) and blue (B) color signals of the plurality of subpixels 22 on the video frame 20 into YUV brightness/color signals (Step 100).

Because this conversion is well known in the prior art, it will not be further described. The conversion formulae are as follows:

$$Y=(0.257*R)+(0.504*G)+(0.098*B)+16,$$

$$Cr=V=(0.439*R)-(0.368*G)-(0.071*B)+128, \text{ and}$$

$$Cb=U=-(0.148*R)-(0.291*G)+(0.439*B)+128.$$

where Y is the brightness signal. The present invention first records the YUV brightness/color signal of each pixel in each video frame 20 (Step 102), and calculate the brightness of each Y signal of all the pixels in the video frame 20 to obtain the number of each brightness value by gathering statistics, thereby generating an original brightness curve of the video frame (Step 104).

Figure 4:
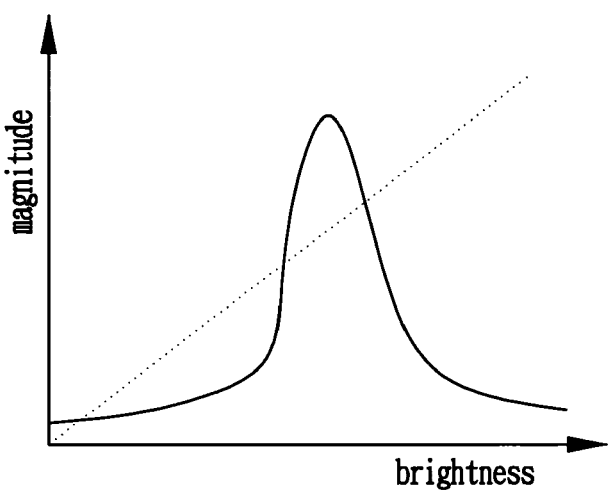
FIG. 4 is a basic brightness curve of a video frame of the present invention.
Figure 5:
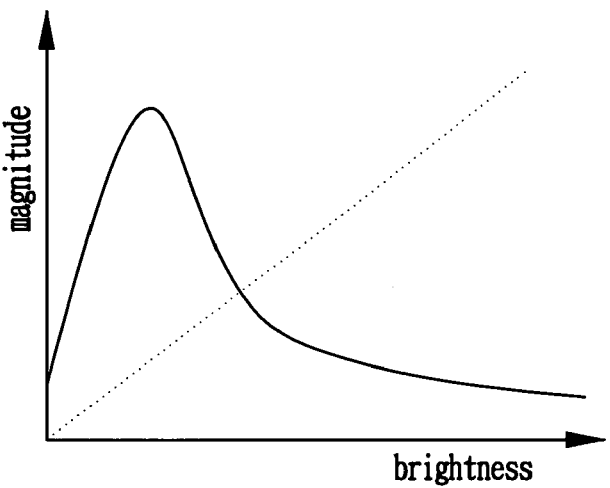
FIG. 5 is a brightness curve of a too-dark video frame.
Figure 6:
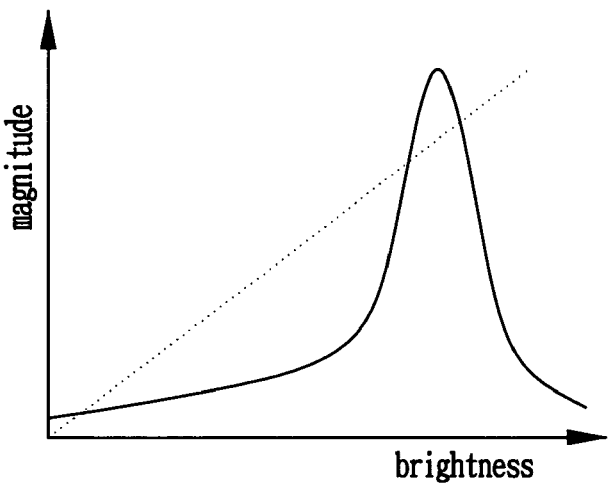
FIG. 6 is a brightness curve of a too-bright video frame.

FIG. 4 shows a basic brightness curve of a video frame of the present invention, FIG. 5 shows a brightness curve of a too-dark video frame, while FIG. 6 shows a brightness curve of a too-bright video frame.

Figure 7:
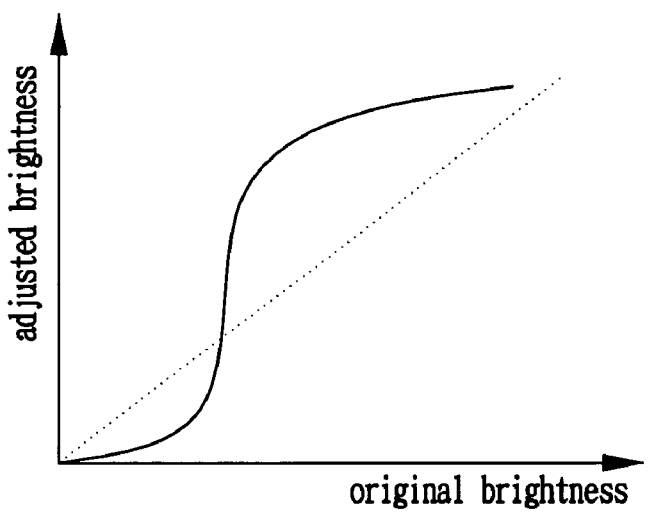
FIG. 7 is a diagram of an equalization brightness curve.

Next, the brightness and contrast of the YUV brightness/color signals of the plurality of pixels of the video frame 20 are adjusted by means of the histogram equalization technique (Step 108). An equalization brightness curve (i.e., a statistics curve of each brightness value before and after adjustment) can be generated by gathering statistics of the number of each brightness difference value of all pixels in the video frame 20 before and after histogram equalization (Step 110). FIG. 7 shows an equalization brightness curve.

Figure 8:
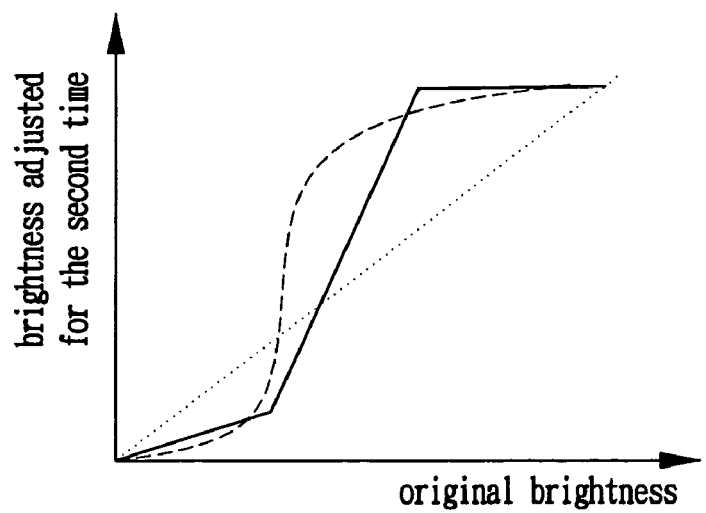
FIG. 8 is a diagram of an equalization brightness curve after the second adjustment.

As stated above, the histogram equalization technique will cause problems like noise and glittering. Therefore, for every pixel pair with small brightness difference before histogram equalization, a second adjustment is required to make the brightness difference after histogram equalization not too large. In the present invention, the brightness of each pixel before and after adjustment is compared with the brightness of any pixel of the video frame one by one to generate a comparison difference value. For dots with a brightness difference value of 1 before adjustment, the brightness difference value can't be larger than Y1 or smaller than Y2 after adjustment, wherein 1.5<Y1<3, and 0.25<Y2<0.75. For instance, if the brightness value of the $30^{th}$ pixel is 100 and the brightness value of the $89^{th}$ pixel is 101, the brightness value of the $89^{th}$ pixel can't be larger than 100+Y1 and smaller than 100+Y2 after adjustment. FIG. 8 is a diagram of an equalization brightness curve after the second adjustment.

Figure 9:
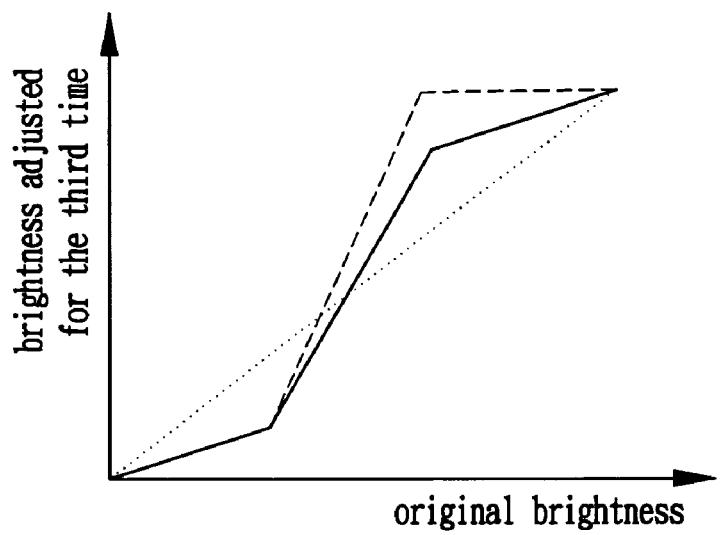
FIG. 9 is a diagram of an equalization brightness curve after the third adjustment.

In order to avoid an excessively large brightness difference value of each pixel before and after brightness adjustment, a third adjustment is performed. The brightness of each pixel before and after adjustment is compared, one by one (Step 112), to generate the brightness difference value of each pixel. The brightness difference value of each pixel before and after adjustment is restricted to be not larger than a largest brightness value and not smaller than a smallest brightness value. Any brightness difference value larger than the largest brightness value is set to be equal the largest brightness value, and any brightness difference value smaller than the smallest brightness value is set to be equal the smallest brightness value (Step 114). FIG. 9 shows an equalization brightness curve after the third adjustment.

The largest brightness value and the smallest brightness value can be constant values, or can vary according to the too-bright or too-dark degree of the original brightness curve. Besides, the brightness difference value of each pixel can be multiplied by a scale, and the brightness difference value is set to not exceed a largest brightness difference value.

Because the brightness of each frame 20 is adjusted in the present invention, the brightness difference between the video frame 20 after adjustment and one or more video frames 20 before may be too large, resulting in an unstable display or glittering. Therefore, a fourth adjustment is required. The equalization brightness curves of several video frames 20 of close times are compared (Step 116) to make the brightness difference value of each pixel 22 of each video frame 20 before and after at least one adjustment be less than or equal to a largest brightness difference value (Step 118), thereby ensuring that video frames 20 with originally close brightness are not excessively different after adjustment.

Figure 10:
FIG. 10 shows a color intensity adjustment curve.

After the brightness of each video frame 20 is adjusted, the color intensity of video frames will change due to increase or decrease of brightness. Therefore, the YUV color intensity of each pixel is adjusted (e.g., gamma correction) after the brightness of each pixel is adjusted (Step 120). The number of red or blue color can increase or decrease according to the distribution of red or blue color in each video frame. The red color can be extra weighted to increase the vividness of color. FIG. 10 shows a color intensity adjustment curve.

Finally, the YUV brightness/color signals of the plurality of pixels in each video frame 20 are converted into red (R'), green (G') and blue (B') color signals. The conversion formulae are as follows:

$$B=1.164(Y-16)+2.018(U-128),$$

$$G=1.164(Y-16)-0.813(V-128)-0.391(U-128), \text{ and}$$

$$R=1.164(Y-16)+1.596(V-128).$$

After conversion, the video signal 20 can be output to the display 13. A clearer frame having vivid colors can thus be generated when a user watches the video.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A method for dynamically adjusting video brightness, the method comprising at least the steps of:
    (a). performing histogram equalization to a video brightness/color signal to generate an equalization brightness curve;
    (b). comparing the brightness of each pixel before and after histogram equalization with the brightness of every pixel one by one to generate a comparison difference value, adjusting the brightness of said pixel to be not larger than three times of said comparison difference value and not smaller than a fourth of said comparison difference value; and
    (c). comparing the brightness of each pixel, one by one, before and after histogram equalization to generate a brightness difference value, adjusting the brightness of said pixel to be not larger than a largest brightness value and not smaller than a smallest brightness value.

2. The method for dynamically adjusting video brightness as claimed in claim 1, further comprising the following step before said Step (a):

inputting a video signal having a plurality of said video frames, each said video frame being composed of a plurality of pixels, and each said pixel using red, green and blue color signals to generate said subpixels.

3. The method for dynamically adjusting video brightness as claimed in claim 1, wherein said video brightness/color signal in said Step (a) is a YUV brightness/color signal.

4. The method for dynamically adjusting video brightness as claimed in claim 1, further comprising the following step before said Step (a):

converting red, green and blue color signals of a plurality of video frames into said video brightness/color signal.

5. The method for dynamically adjusting video brightness as claimed in claim 4, wherein formulae for converting said red, green and blue color signals into a YUV brightness/color signal.

6. The method for dynamically adjusting video brightness as claimed in claim 1, further comprising the following steps before said Step (a):

recording the brightness/color signal of each said video frame to generate an original brightness curve of each said video frame; and comparing said original brightness curve with a basic brightness curve to determine whether said video frame is too bright or too dark.

7. The method for dynamically adjusting video brightness as claimed in claim 6, wherein said original brightness curve is obtained by gathering statistics of a number of each brightness value of all pixels in said video frame.

8. The method for dynamically adjusting video brightness as claimed in claim 1, wherein said equalization brightness curve in said Step (a) is obtained by gathering statistics of the brightness difference value of all pixels in said video frame before and after histogram equalization.

9. The method for dynamically adjusting video brightness as claimed in claim 1, wherein adjustment of each pixel brightness in said Step (C) is accomplished by making every brightness difference values larger than said largest brightness value equal to said largest brightness value and every brightness difference values smaller than said smallest brightness value equal to said smallest brightness value.

10. The method for dynamically adjusting video brightness as claimed in claim 9, wherein said largest brightness value and said smallest brightness value are constant values.

11. The method for dynamically adjusting video brightness as claimed in claim 9, wherein said largest brightness value and said smallest brightness value are values that can be varied according to the brightness value.

12. The method for dynamically adjusting video brightness as claimed in claim 1, wherein adjustment of each pixel brightness in said Step (C) is accomplished by multiplying each pixel brightness value before and after histogram equalization by a scale and making said brightness difference value of said pixel not exceed a largest brightness difference value.

13. The method for dynamically adjusting video brightness as claimed in claim 1, further comprising the following step after said Step (c):

comparing said equalization brightness curve of said video frame and that of at least a video frame before and making each said pixel brightness of each said video frame be not larger than a largest brightness difference value after at least one adjustment.

14. The method for dynamically adjusting video brightness as claimed in claim 1, further comprising the following step after said Step (c):

adjusting the color intensity of each said pixel, and increasing or decreasing a magnitude of the red or blue color according to the distribution of the red or blue colors in each video frame.

15. The method for dynamically adjusting video brightness as claimed in claim 14, wherein the red color is given extra weight to increase vividness of color.

16. The method for dynamically adjusting video brightness as claimed in claim 1, further comprising the following step after said Step (c):

converting said video brightness/color signal after adjustment into red, green and blue color signals of said video frame.

17. The method for dynamically adjusting video brightness as claimed in claim 16, wherein said brightness/color signal is a YUV brightness/color signal, and formulae for converting said brightness/color signal into red, green and blue color signals.

* * * * *